(12) United States Patent
Wilmot et al.

(10) Patent No.: US 10,598,148 B2
(45) Date of Patent: Mar. 24, 2020

(54) SYSTEM FOR CONTROLLING A YAW DRIVE OF A WIND TURBINE WHEN A NATIVE YAW DRIVE CONTROL SYSTEM IS NON-OPERATIONAL

(71) Applicant: General Electric Company, Schenectady, NY (US)

(72) Inventors: Theodore Steven Wilmot, Laurens, SC (US); Jonathan Paul Signore, Latham, NY (US); Gaylon Mitchell Pfeiffer, Boston, MA (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 15/682,667

(22) Filed: Aug. 22, 2017

(65) Prior Publication Data

US 2019/0063402 A1 Feb. 28, 2019

(51) Int. Cl.
*F03D 7/02* (2006.01)
*F03D 7/04* (2006.01)
*F03D 80/50* (2016.01)

(52) U.S. Cl.
CPC .......... *F03D 7/0204* (2013.01); *F03D 7/042* (2013.01); *F03D 7/047* (2013.01); *F03D 80/50* (2016.05); *F05B 2270/1074* (2013.01); *F05B 2270/329* (2013.01); *F05B 2270/502* (2013.01); *F05B 2270/80* (2013.01)

(58) Field of Classification Search
CPC .. F03D 7/0204; F03D 7/042; F05B 2270/329; F05B 2270/502; F05B 2270/80
See application file for complete search history.

(56) References Cited

U.S. PATENT DOCUMENTS

| 8,410,625 | B2* | 4/2013 | Stiesdal | F03D 7/0204 |
| | | | | 290/44 |
| 8,899,920 | B2* | 12/2014 | Andersen | F03D 7/0204 |
| | | | | 290/44 |
| 9,551,319 | B2* | 1/2017 | Rasmusen | F03D 7/0204 |
| 2012/0073134 | A1 | 3/2012 | Bywaters et al. | |

(Continued)

FOREIGN PATENT DOCUMENTS

| EP | 2 738 382 A2 | 6/2014 |
| EP | 3 128 170 A1 | 2/2017 |

OTHER PUBLICATIONS

Extended European Search Report and Opinion issued in connection with corresponding EP Application No. 18189148.2 dated Feb. 5, 2019.

*Primary Examiner* — Viet P Nguyen
*Assistant Examiner* — Joseph Ortega
(74) *Attorney, Agent, or Firm* — Dority & Manning, P.A.

(57) ABSTRACT

The present disclosure is directed to a system for controlling a yaw drive of a wind turbine when a native yaw drive control system is non-operational. The system includes an external sensor configured to detect a parameter indicative of a wind condition experienced by the wind turbine. The system also includes an external controller communicatively coupled to the external sensor. The external controller is configured to control the yaw drive based on measurement signals received from the external sensor. The external sensor and the external controller are electrically isolated from the native yaw drive control system.

19 Claims, 5 Drawing Sheets

(56) References Cited

U.S. PATENT DOCUMENTS

| | | | |
|---|---|---|---|
| 2013/0272877 A1* | 10/2013 | Andersen | F03D 7/02 |
| | | | 416/1 |
| 2015/0086357 A1* | 3/2015 | Gregg | F03D 7/046 |
| | | | 416/1 |
| 2015/0233348 A1* | 8/2015 | Hiremath | F03D 7/02 |
| | | | 416/1 |
| 2015/0240783 A1* | 8/2015 | Kii | F03D 7/0204 |
| | | | 290/44 |
| 2015/0292483 A1* | 10/2015 | Slack | F03D 7/0276 |
| | | | 290/44 |
| 2015/0308406 A1* | 10/2015 | Li | F03D 80/20 |
| | | | 290/44 |
| 2015/0369213 A1* | 12/2015 | Jakobsson | F03D 7/0204 |
| | | | 416/153 |
| 2015/0377215 A1* | 12/2015 | Agarwal | F03D 7/044 |
| | | | 416/1 |
| 2016/0115941 A1* | 4/2016 | Marwaha | F03D 7/046 |
| | | | 416/1 |
| 2017/0241409 A1* | 8/2017 | Kær | G01P 13/02 |

* cited by examiner

SYSTEM FOR CONTROLLING A YAW DRIVE OF A WIND TURBINE WHEN A NATIVE YAW DRIVE CONTROL SYSTEM IS NON-OPERATIONAL

FIELD

The present disclosure generally relates to wind turbines. More particularly, the present disclosure relates to systems for controlling yaw drives of wind turbines when an associated native yaw drive control systems is non-operational.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

Wind turbines typically include a yaw drive, which adjusts a yaw angle (i.e., the angle of the nacelle relative to the tower) of the wind turbine to properly orient the rotor blades relative to the direction of the wind. In this respect, the yaw drive may include one or more yaw adjustment mechanisms, which rotate the nacelle relative to the tower. Furthermore, the wind turbine includes a yaw drive control system for controlling the operation of the various components of the yaw drive, such as the yaw adjustment mechanisms.

During maintenance operations, various components of the yaw drive control system (e.g., power supplies, controllers, sensors, etc.) may be disabled, removed from the wind turbine, or otherwise non-operational. When this occurs, the yaw angle of the wind turbine cannot be adjusted. During certain maintenance activities, it may be necessary to move maintenance equipment, such as cranes, relative to the nacelle. The movement of such equipment increases the duration and the cost of the maintenance operation. Furthermore, an inability to adjust the yaw angle of the wind turbine may result in undesirable aerodynamic loading on nacelle and/or rotor.

Accordingly, a system for controlling a yaw drive of a wind turbine when a native yaw drive control system is non-operational would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a system for controlling a yaw drive of a wind turbine when a native yaw drive control system is non-operational. The system includes an external sensor configured to detect a parameter indicative of a wind condition experienced by the wind turbine. The system also includes an external controller communicatively coupled to the external sensor. The external controller is configured to control the yaw drive based on measurement signals received from the external sensor. The external sensor and the external controller are electrically isolated from the native yaw drive control system.

In another aspect, the present disclosure is directed to a wind turbine including a tower and a nacelle mounted atop the tower. The wind turbine also includes a rotor rotatably coupled to the nacelle. The rotor includes at least one rotor blade. The wind turbine further includes a yaw drive for adjusting a yaw angle of the nacelle and a native yaw drive control system. Furthermore, the wind turbine includes a system for controlling the yaw drive of the wind turbine when the native yaw drive control system is non-operational. The system includes an external controller communicatively coupled to the external sensor. The external controller is configured to control the yaw drive based on received measurement signals or received input signals. The external controller is electrically isolated from the native yaw drive control system.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
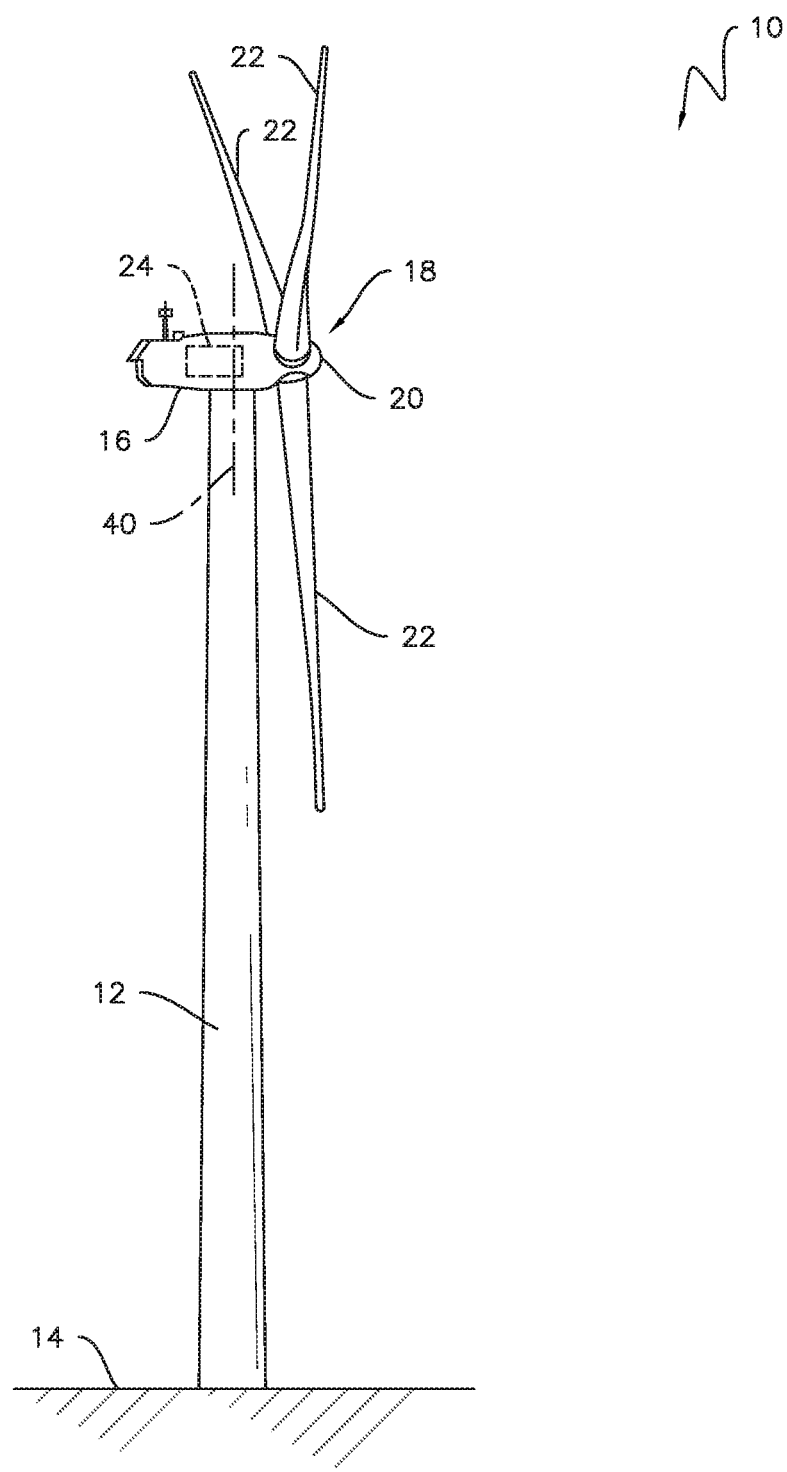
FIG. 1 is a perspective view of an exemplary wind turbine in accordance with embodiments of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 is a perspective view of an exemplary wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outward from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotation of the rotor 18 to convert kinetic energy from the wind into usable rotational, mechanical energy. A generator 24 positioned in the nacelle 16 may generate electrical power from the rotational energy of the rotor 18.

Figure 2:
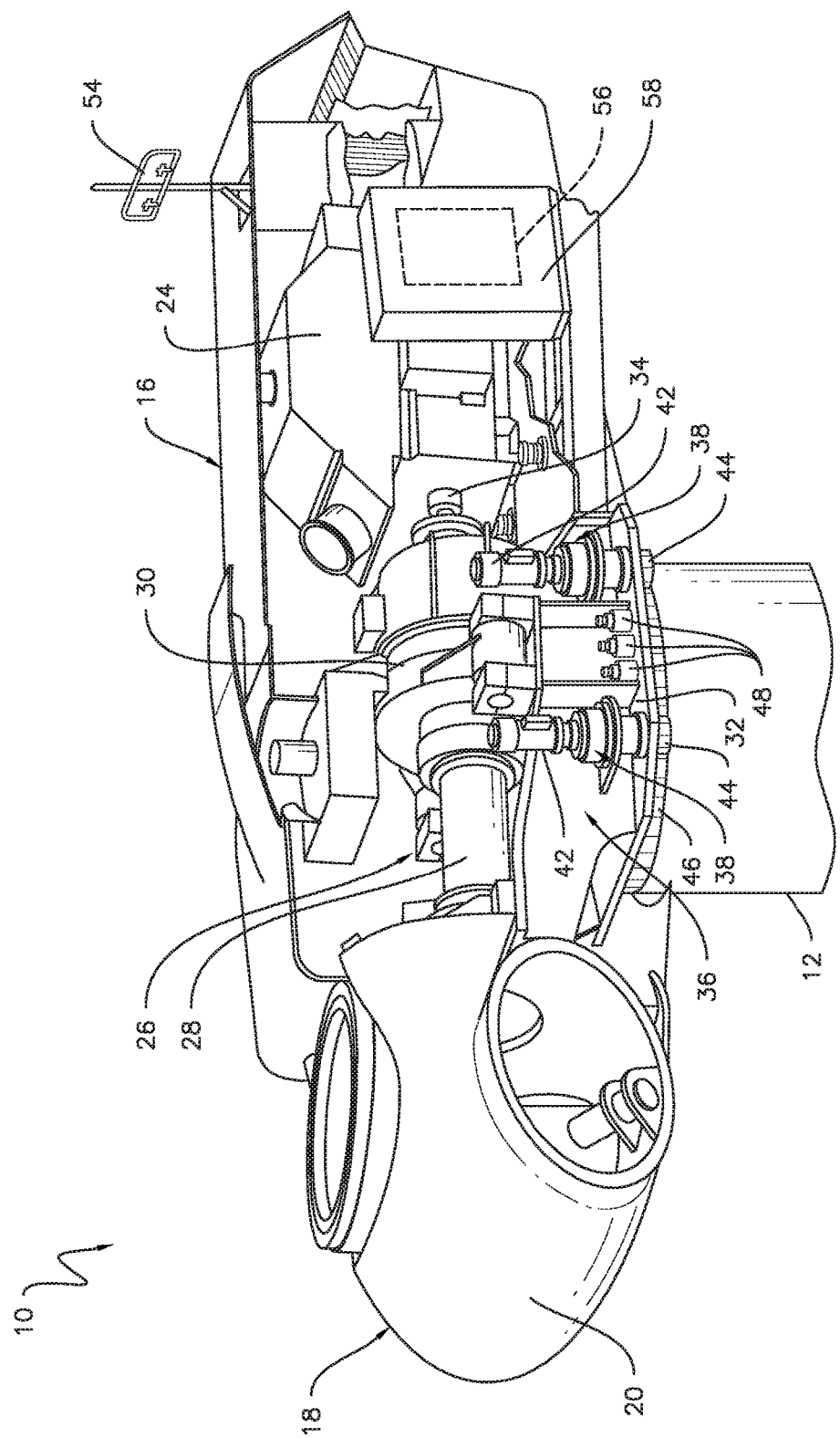
FIG. 2 is a perspective, internal view of an exemplary nacelle of a wind turbine in accordance with embodiments of the present disclosure.

Referring now to FIG. 2, a drivetrain 26 rotatably couples the rotor 18 to the generator 24. As shown, the drivetrain 26 may include a rotor shaft 28, which rotatably couples the hub 20 of the rotor 18 to a gearbox 30. The gearbox 30 may be supported by and coupled to a bedplate 32 within the nacelle 16. The drivetrain 26 may also include a generator shaft 34, which rotatably couples the gearbox 30 to the generator 24. In this respect, rotation of the rotor 18 drives the generator 24. More specifically, the rotor shaft 28 may provide a low speed, high torque input to the gearbox 30 in response to rotation of the rotor blades 22 and the hub 20. The gearbox 30 may then convert the low speed, high torque input to a high speed, low torque output to drive the generator shaft 34 and, thus, the generator 24. In alternate embodiments, however, the generator 24 may be directly rotatably coupled to the rotor shaft 28 in a direct-drive configuration.

The wind turbine 10 may also include a native yaw drive 36 for adjusting a yaw angle of the nacelle 16 (i.e., the angular orientation of the nacelle 16 relative to the tower 12). In particular, the nacelle 16 may be rotatably coupled to the tower 12 by a yaw bearing (not shown). As such, the native yaw drive 36 may include one or more native yaw adjustment mechanisms 38, which rotate the nacelle 16 about a yaw axis 40 (FIG. 1) relative to the tower 12 to adjust the yaw angle of the nacelle 16. Although FIG. 2 illustrates two yaw adjustment mechanisms 38, the wind turbine 10 may include any suitable number of yaw adjustment mechanisms 38, such as a single yaw adjustment mechanism 38 or more than two yaw adjustment mechanisms 38. For example, certain embodiments of the native yaw drive 36 may include four yaw adjustment mechanisms 38.

FIG. 2 illustrates an exemplary embodiment of the yaw adjustment mechanisms 38. More specifically, each yaw adjustment mechanism 38 may include an electric motor 42 mounted to and/or through the bedplate 32. Each electric motor 42 may include a pinion gear 44 coupled thereto, which engages a tower ring gear 46 coupled to the tower 12. During operation of the yaw adjustment mechanisms 38, the electric motors 42 rotate the corresponding pinion gears 44, which rotate the tower ring gear 46. The rotation of the pinion gears 44 relative to the tower ring gear 46 causes the nacelle 16 to rotate about the yaw axis 40 (FIG. 1). In alternate embodiments, the yaw adjustment mechanisms 38 may include any suitable type of actuator and/or any suitable structure or mechanism for transmitting movement between the tower 12 and the nacelle 16.

The native yaw drive 36 may also include one or more native brake assemblies 48 for controlling the rotation of the nacelle 16 about the yaw axis 40. For example, as shown in the illustrated embodiment, the brake assemblies 48 may be mounted to and/or through the bedplate 32. As such, each brake assembly 48 may frictionally engage the tower ring gear 46 or another suitable friction surface of the wind turbine 10 to stop, slow, and/or otherwise control the rotation of the nacelle 16 about the yaw axis 40. The wind turbine 10 may include any suitable number of brake assemblies 48. For instance, in an exemplary embodiment, the wind turbine 10 may include between twelve and twenty brake assemblies 48. In other embodiments, however, the wind turbine 10 may include less than twelve brake assemblies 48 or more than twenty brake assemblies 48.

Figure 3:
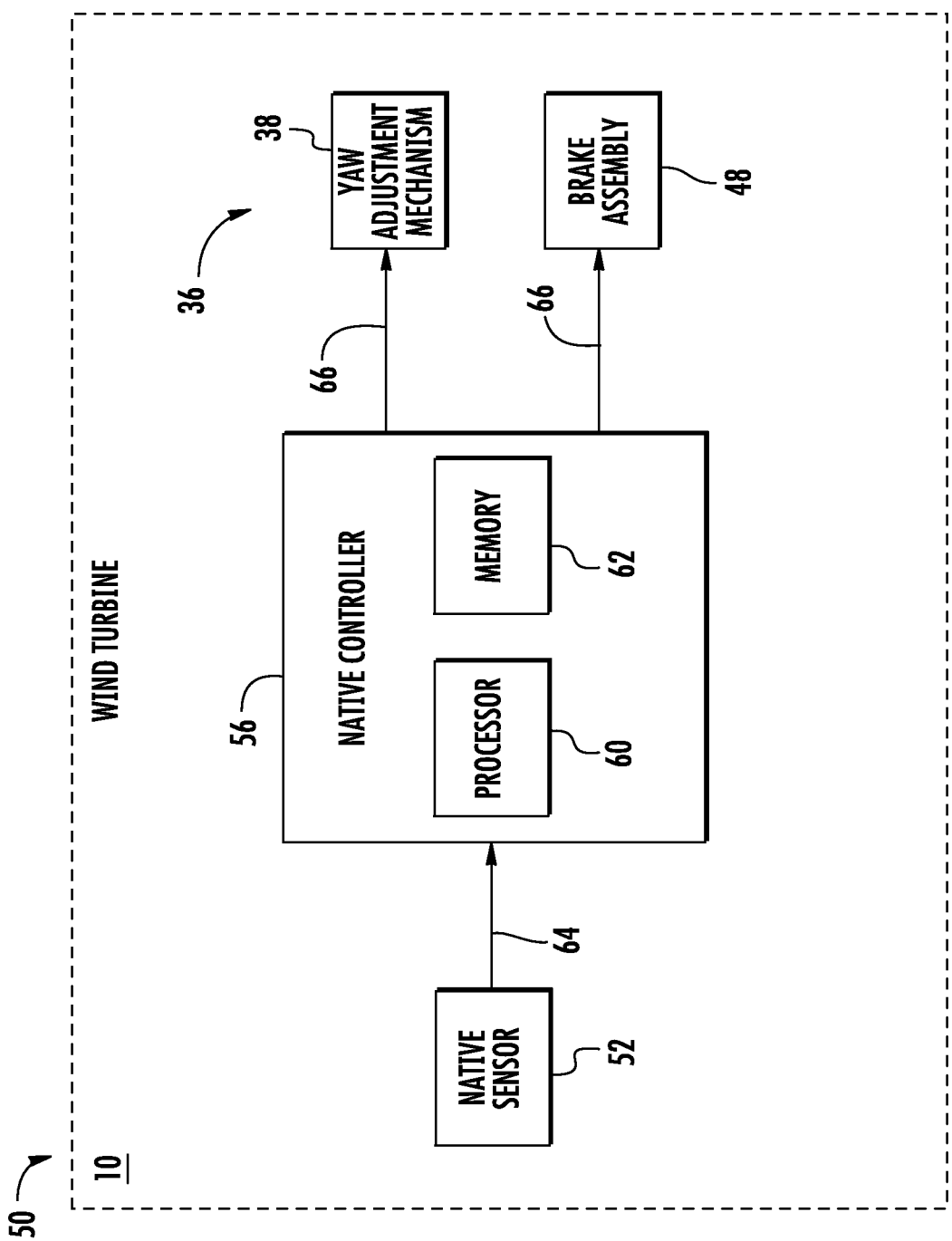
FIG. 3 is a schematic view of one embodiment of an exemplary native yaw drive control system of a wind turbine in accordance with embodiments of the present disclosure.

Referring now to FIG. 3, the wind turbine 10 may include a native yaw drive control system 50 ("native control system 50") for controlling the operation of one or more components of the native yaw drive 36, such as the yaw adjustment mechanisms 38 and/or the brake assemblies 48. In general, the native control system 50 controls the native yaw drive 36 during operation of the wind turbine 10, such as when the wind turbine 10 is generating power or otherwise not disabled or partially disabled for maintenance or repair operations. In the embodiment shown in FIG. 3, for example, all of the components of the native control system 50 may be located within the wind turbine 10. In alternative embodiments, however, some of the components of the native control system 50 may be positioned outside of the wind turbine 10.

As shown, the native control system 50 may include one or more native sensors 52 for detecting one or more parameters indicative of a wind condition experienced by the wind turbine 10. Although FIG. 3 illustrates only one native sensor 52, the native control system 50 may include any suitable number of native sensors 52. For example, in several embodiments, the native sensor 52 may be a wind speed sensor 54 shown in FIG. 2. Specifically, the wind speed sensor 54 detects a wind speed and/or direction experienced by the wind turbine 10 and, more particularly, the nacelle 16. In this respect, the wind speed sensor 54 may be an anemometer, a wind vane, or any other suitable type of sensor for measuring wind speed and/or direction. In some embodiments, the wind speed sensor 54 may be mounted to the exterior of the nacelle 16. In alternative embodiments, however, the native sensor 52 may be any suitable type of sensor for measuring any suitable parameter of the wind turbine 10 or the environment proximate to the wind turbine 10.

The native control system 50 may also include a native controller 56 communicatively coupled to one or more components of the native control system 50 and/or the native yaw drive 36, such as the sensors 52, the yaw adjustment mechanisms 38, and the brake assemblies 48. Although FIG. 3 illustrates the native controller 56 as being communicatively coupled to only one native sensor 52, one yaw adjustment mechanism 38, and one brake assembly 48, the native controller 56 may be communicatively coupled to any suitable number of native sensors 52, yaw adjustment mechanisms 38, and/or brake assemblies 48. For example, in some embodiments, the native controller 56 may be communicatively coupled to all of the yaw adjustment mechanisms 38 and brake assemblies 48 in the native yaw drive 36. As shown in FIG. 2, for example, the native controller 56 may be disposed within a control cabinet 58 mounted within a portion of the nacelle 16. In alternate embodiments, however, the native controller 56 may be disposed at any location on or in the wind turbine 10, at any location on the support surface 14, or any other suitable location.

In general, the native controller 56 may correspond to any suitable processor-based device, including one or more computing devices. As shown in FIG. 3, for example, the native controller 56 may include one or more processors 60 and one or more associated memory devices 62 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory devices 62 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device 62 may store instructions that, when executed by the processor 60, cause the processor 60 to perform various functions, such as controlling the native yaw drive 36.

As mentioned above, the native control system 50 controls the operation of the native yaw drive 36 during operation of the wind turbine 10. For example, in the embodiment shown in FIG. 3, the native controller 56 may receive measurement signals (e.g., as indicated by arrow 64) from the native sensor 52 during operation of the wind turbine 10. Based on these measurement signals 64, the native controller 56 may transmit controls signals (e.g., as indicated by arrow 66) to the yaw adjustment mechanism 38 and the brake assembly 48 for controlling the yaw angle of the wind turbine 10. In this respect, the native control system 50 may further include the necessary communication interfaces, circuitry, and/or other electrical/communication devices necessary to facilitate such operation of the native yaw drive 36.

In alternative embodiments, the native control system 50 may include other components in addition to the native sensor 52, the native controller 56, and the associated communication interfaces and circuitry. Furthermore, the native control system 50 may operate in any suitable manner that permits control of the yaw angle of the wind turbine 10.

Figure 4:
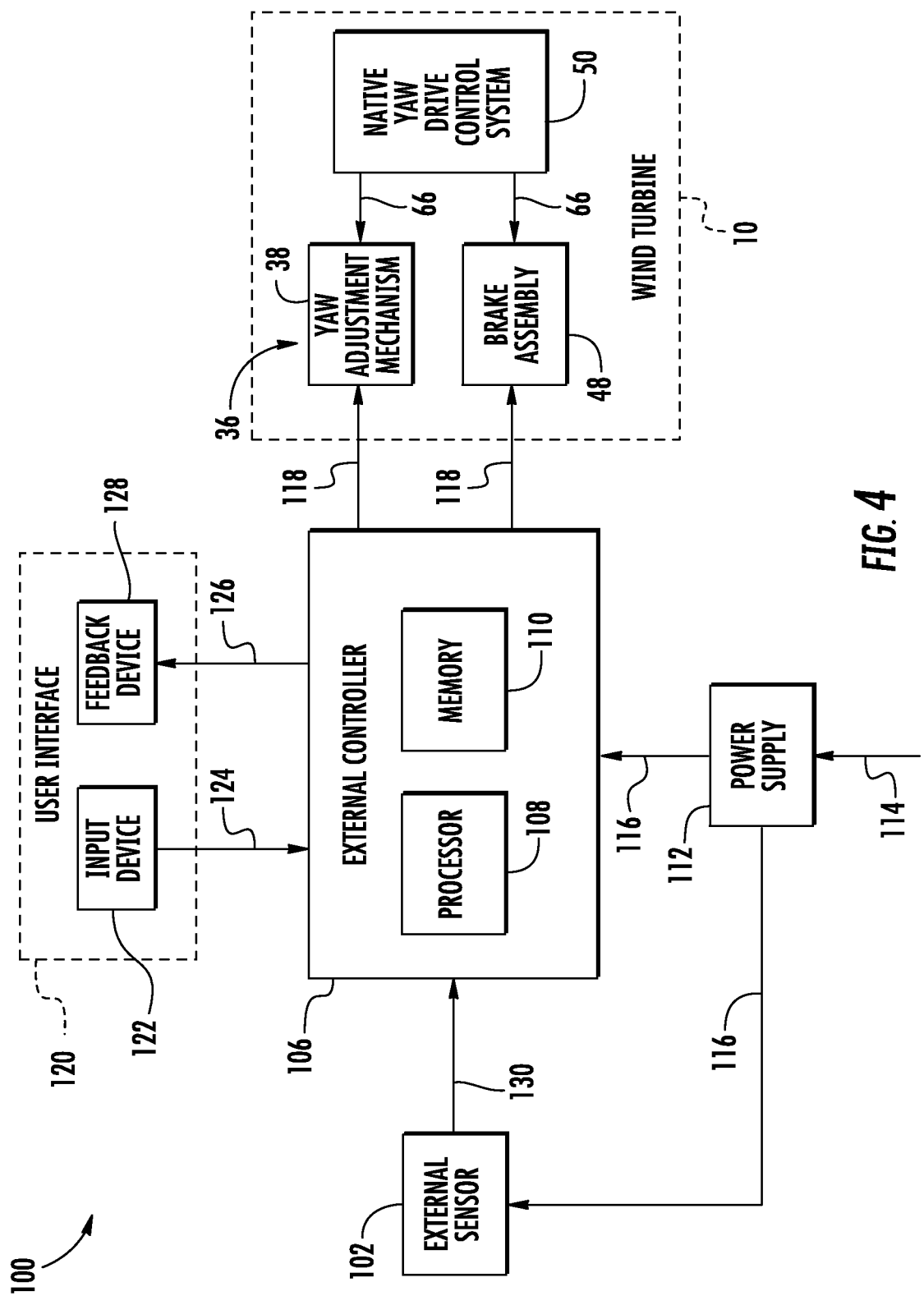
FIG. 4 is a schematic view of one embodiment of a system for controlling a yaw drive of a wind turbine when a native yaw drive control system is non-operational in accordance with embodiments of the present disclosure.

FIG. 4 is a schematic view of one embodiment of a system 100 for controlling a yaw drive of a wind turbine when a native yaw drive control system is non-operational. In general, the system 100 will be described below with reference to the wind turbine 10. Nevertheless, the disclosed system 100 may be used to control a yaw drive of any wind turbine having any suitable wind turbine configuration when an associated native yaw drive control system is non-operational.

As mentioned above, the system 100 may be used when the native control system 50 is non-operational. For example, the native control system 50 may be non-operational during various maintenance and repair operations. In such instances, some or all of the native control system 50 may be disabled, such as via a suitable lock-out, tag-out (LOTO) procedure. Furthermore, in some maintenance or repair activities, certain components of the native control system 50 may be removed from the wind turbine 10. As such, the native control system 50 is non-operational when the native control system 50 is unable to control the native yaw drive 36.

As shown in FIG. 4, the system 100 includes one or more external sensors 102 for detecting one or more parameters indicative of a wind condition experienced by the wind turbine 10. In general, the external sensors 102 are electrically and/or communicatively isolated from the native control system 50. As such, the external sensors 102 are not reliant on any component of the native control system 50 to support or otherwise facilitate its operation. In this respect, the external sensors 102 may be operable when the native control system 50 is non-operational. Although FIG. 4 illustrates only one external sensor 102, the system 100 may include any suitable number of external sensors 102.

Figure 5:
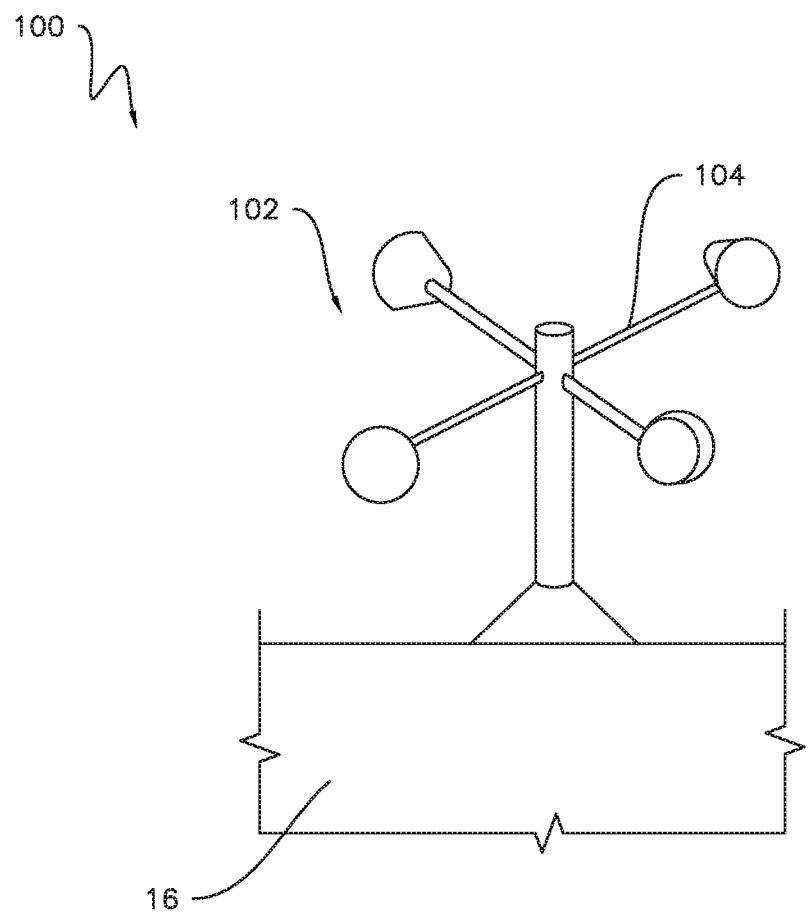
FIG. 5 is a side view of one embodiment of an external sensor of a system for controlling a yaw drive of a wind turbine when a native yaw drive control system is non-operational, illustrating the external sensor mounted to a nacelle of a wind turbine in accordance with embodiments of the present disclosure.

In several embodiments, each external sensor 102 may correspond to one of the native sensors 52. As such, the external sensor 102 may provide the same information to the system 100 as the native sensors 52 provides to the native control system 50. In this respect, the external sensor 104 may be configured to detect the same or similar parameters as the native sensor 52. For example, as illustrated in FIG. 5, the external sensor 102 may be a wind speed sensor 104 that detects a wind speed and/or wind direction experienced by the wind turbine 10 and, more particularly, the nacelle 16. As such, the wind speed sensor 104 may be an anemometer, a wind vane, or any other suitable type of sensor for measuring wind speed and/or wind direction. In alternate embodiments, the external sensor 102 may be configured to detect a different parameter than the native sensor 52. In further embodiments, the external sensor 102 may be any suitable type of sensor for measuring any suitable parameter of the wind turbine 10 or the environment proximate to the wind turbine 10.

The system 100 also includes an external controller 106 configured to be communicatively coupled to one or more components of the system 100 and/or the native yaw drive 36, such as the sensor 102, the yaw adjustment mechanisms 38, and the brake assemblies 48. In general, the external controller 106 is electrically and/or communicatively isolated from the native control system 50. As such, the external controller 106 is not reliant on any component of the native control system 50 to support or otherwise facilitate its operation. In this respect, the external controller 106 may be operable when the native control system 50 is non-operational. Although FIG. 4 illustrates the external controller 106 as being communicatively coupled to only one external sensor 102, one yaw adjustment mechanism 38, and one brake assembly 48, the external controller 106 may be communicatively coupled to any suitable number of external sensors 52, yaw adjustment mechanisms 38, and/or brake assemblies 48. In particular embodiments, the external controller 106 may be communicatively coupled to all of the yaw adjustment mechanisms 38 and brake assemblies 48 in the native yaw drive 36.

In general, the external controller 106 may correspond to any suitable processor-based device, including one or more computing devices. As shown in FIG. 4, for example, the external controller 106 may include one or more processors 108 and one or more associated memory devices 110 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory devices 110 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device 110 may store instructions that, when executed by the processor 108, cause the processor 108 to perform various functions, such as controlling the native yaw drive 36.

In several embodiments, the external controller 106 may include variable frequency drive (VFD) architecture. In such embodiments, the external controller 106 may be configured to generate control signals (e.g., as indicated by arrows 118) having a plurality of voltages and/or frequencies. In this respect, the external controller 106 may be compatible with wind turbines and associated yaw drives having varying operating voltages and/or frequencies. As such, the VFD architecture may permit use of the system 100 with wind turbines of different sizes, power outputs, manufacturers, and/or the like. In alternative embodiments, the external controller 106 may not include VFD architecture.

The system 100 may further include a power supply 112 electrically coupled to one or more components of the system 100, such as the external sensor 102 and the external controller 16. More specifically, the power supply 112 may be configured to receive electric power from a suitable power source (e.g., as indicated by arrow 114), such as a portable generator, an electric grid, or the wind turbine 10. The power supply 112 may then be configured to convert or otherwise modify the electric power provided by the power source 114 into a form suitable for use by system 100. For example, the power supply 112 may convert an alternating current power from the electric grid to direct current for use by the external controller 106. As shown, the power supply 112 may supply the electric power (e.g., as indicated by arrows 116) to the external sensor 102 and/or the external controller 106. Although the power supply 112 is illustrated as providing electric power 116 directly to the external sensor 102, the external sensor 102 may also receive the electric power 116 from the external controller 106. The external controller 106 may also provide electrical power to the native yaw drive 36 in the form of control signals 118. As such, the system 100 may operate the native yaw drive 36 without the need for power from the native control system 50. In alternate embodiments, the power supply 112 may provide the electric power 116 directly to the native yaw drive 36. As such, the control signals 118 may actuate a suitable relay or thyristor to control the delivery of electric power to the native yaw drive 36. In further embodiments, the system 100 may receive electrical power directly from the power source 114.

Furthermore, the system 100 may include a user interface 120 communicatively coupled to the external controller 106. In general, the user interface 120 may be configured to allow interaction between a user and the external controller 106. For example, user interface 120 may include one or more input devices 122 (e.g., touchscreens, keypad, touchpad, knobs, buttons, sliders, switches, mouse, microphone, other hardware interfaces, etc.) configured to receive user input.

The user interface 120 may then transmit the user input to the external controller 106 as user input signals (e.g., as indicated by arrow 124). Furthermore, in some embodiments, the external controller 106 may provide feedback regarding various operating and/or environmental conditions of the wind turbine 10. In such instances, the external controller 106 may transmit feedback signals (e.g., as indicated by arrow 126) to the user interface 120. In this respect, the user interface 120 may include one or more feedback devices 128 (e.g., display screens, speakers, warning lights, etc.) that communicate the feedback from the external controller 106 to the user. The input and feedback devices 122, 128 may be integrated as a single component (e.g., a touchscreen) or be separate and distinct components (e.g., a keypad and a display screen). In alternate embodiments, however, the system 100 may not include the user interface 120.

In several embodiments, the system 100 may generally be configured to be portable. For example, the external controller 106 and user interface 120 may be configured to be carried up the tower 12 and placed within the nacelle 16 during maintenance or repair activities. In such embodiments, a wiring harness (not shown) may communicatively and electrically couple the external controller 106 to the native yaw drive 36. For example, the wiring harness may include leads that connect to each native yaw adjustment mechanism 38 and each native brake assembly 48. Although, the external controller 106 and user interface 120 may be configured for placement in any suitable location, such as a location on the support surface 14. Furthermore, as shown in FIG. 5, the external sensor 102 may be configured for removable mounting on the exterior of the nacelle 16. In alternate embodiments, however, the wind speed sensor 104 may be mounted in any suitable location, such as a location on the support surface 14.

As mentioned above, the system 100 is configured to control the native yaw drive 36 of the wind turbine 10 when the native control system 50 is non-operational. In this respect, the system 100 may control the yaw angle of wind turbine 10 to prevent undesirable aerodynamic loading on the nacelle 16 during periods when the native control system 50 is unable to operate the native yaw drive 36. More specifically, the external controller 106 may be configured to control the native yaw drive 36 based on measurement signals (e.g., as indicated by arrow 130) received from the external sensor 102. In some embodiments, the measurement signals 130 may be indicative of the wind conditions experienced by the wind turbine 10. The external controller 106 may include a look-up table or suitable mathematical formula stored within the memory 110 that correlates the sensor measurements to a desired yaw angle. When the desired yaw angle is different than the current yaw angle, the external controller 106 is configured to generate the controls signals 118 that control the various components of the native yaw drive 36 to adjust the current yaw angle of the wind turbine 10 to the desired yaw angle. As such, the external controller 106 may be configured to transmit the control signals 118 to the yaw adjustment mechanisms 38 and/or the brake assemblies 48, which execute the desired change in yaw angle. For example, the controller 106 may be configured to transmit the control signals 118 to the yaw adjustment mechanisms 38 to change the yaw angle of the nacelle 16. When the current yaw angle is the same as the desired yaw angle, the external controller 106 may be configured to transmit the control signals 118 to the brake assemblies 48 to stop the rotation of the nacelle 16. In some embodiments, the system 100 may include a dead band for wind speed or direction such that the external controller 106 may not actuate the native yaw drive 36 when the wind speed or wind direction are in the dead band.

In some embodiments, the external controller 106 may be configured to control the native yaw drive 36 based on other parameters, such as the location of assembly or repair equipment (e.g., cranes, taglines, etc.). For example, the external controller 106 may be configured to prevent the nacelle 16 from contacting the assembly or repair equipment during yaw angle adjustments. In such embodiments, the location of the equipment may be stored in the memory 110 of the external controller 106. Furthermore, the external controller 106 may be configured to prevent operation of the yaw adjustment mechanisms 38 when the brake assemblies 48 are engaged.

The external controller 106 may be configured to control the native yaw drive 36 based on input signals 124 received from the user interface 120. For example, the user may input (e.g., via the input device 122) a desired yaw angle of the wind turbine 10 to the user interface 120. The user interface 120 may, in turn, transmit the user input signals 124, which are indicative of the desired yaw angle, to the external controller 106. The external controller 106 then controls the native yaw drive 36 accordingly. As such, the user may be able to adjust the yaw angle of the wind turbine 10 to a specific location, such as to align with cranes or other repair equipment. In such embodiments, it is not be necessary to move the equipment to align with the nacelle 16 because the nacelle 16 may be moved to align with the equipment.

In certain embodiments, the system 100 may be configured to provide feedback (e.g., via the feedback signals 126 to the feedback device 128) regarding the operation of the system 100, the operation of the wind turbine 10, and/or the environment surrounding the wind turbine 10. For example, the system 100 may be configured to audibly or visually alert (e.g., via warning lights, alarms, etc.) the user when a system error or fault occurs in the system 100 and/or the wind turbine 10. Furthermore, the system 100 may provide an indication of various current operating parameters (e.g., wind speed, wind direction, yaw angle, etc.) of the system 100 and/or the wind turbine 10. In alternative embodiments, the system 100 may provide any suitable form of feedback to the user. In further embodiments, however, the system 100 may not be configured to provide user feedback.

In further embodiments, the system 100 may be configured to provide additional functionality. For example, the external controller 106 may be configured to monitor the temperatures of the various components of the native yaw drive 36 relative to a temperature limit. In this respect, the external controller 106 may also be configured to shut down any component of the native yaw drive 36 when its temperature exceeds the temperature limit. Additionally, the system 100 may be configured to unwind the generator 24 when the wind turbine 10 is non-operational to prevent damage to internal power cables. More specifically, in certain instances, the wind may cause the nacelle 16 to rotate relative to the tower 12. When the nacelle 16 rotates relative to the nacelle more than a predetermined number of consecutive revolutions (e.g., three revolutions) in one direction (e.g., clockwise or counterclockwise), the external controller 106 may be configured to rotate the nacelle 16 in the opposite direction to unwind the nacelle 16.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling a yaw drive of a wind turbine when a native yaw drive control system is non-operational, the system comprising:
   a yaw drive for adjusting a yaw angle of the nacelle;
   a native controller for controlling an operation of the yaw drive when the native controller is operational;
   an external sensor configured to detect a parameter indicative of a wind condition experienced by the wind turbine; and,
   an external controller communicatively coupled to the external sensor and the yaw drive, the external controller configured to control the yaw drive when the native controller is non-operational based on measurement signals received from the external sensor,
   wherein the external sensor and the external controller are electrically and communicatively isolated from the native controller.

2. The system of claim 1, further comprising:
   a power supply configured to provide power to at least one of the external sensor, the external controller, or the yaw drive, the power supply being electrically isolated from the native controller yaw drive control system.

3. The system of claim 1, further comprising:
   a user interface communicatively coupled to the external controller.

4. The system of claim 1, wherein the external controller is configured to control the yaw drive based on input signals received from the user interface.

5. The system of claim 1, wherein the external controller is configured to control one or more yaw adjustment mechanisms of the yaw drive based on measurement signals received from the external sensor.

6. The system of claim 1, wherein the external controller is configured to control one or more yaw brakes of the yaw drive based on measurement signals received from the external sensor.

7. The system of claim 1, wherein the external controller comprises a variable frequency drive architecture.

8. The system of claim 7, wherein the external controller is configured to generate control signals having a plurality of frequencies or voltages.

9. The system of claim 1, wherein the wind condition is a wind direction or a wind speed.

10. A wind turbine, comprising:
    a tower;
    a nacelle mounted atop the tower;
    a rotor rotatably coupled to the nacelle, the rotor comprising at least one rotor blade;
    a yaw drive for adjusting a yaw angle of the nacelle;
    a native controller for controlling an operation of the yaw drive when the native controller is operational; and,
    a system for controlling the yaw drive when the native controller is non-operational, the system comprising:
      an external controller communicatively coupled to the yaw drive, the external controller being configured to control the yaw drive when the native controller is non-operational based on received measurement signals or received input signals, wherein the external controller is electrically and communicatively isolated from the native controller.

11. The wind turbine of claim 10, further comprising:
an external sensor communicatively coupled to the external controller and electrically isolated from the native controller, the external sensor being configured to detect a parameter indicative of a wind condition experienced by the wind turbine and transmit measurement signals to the external controller.

12. The wind turbine of claim 10, further comprising:
a power supply configured to provide power to at least one of the external sensor, the external controller, or the yaw drive, the power supply being electrically isolated from the native controller.

13. The wind turbine of claim 10, further comprising:
a user interface communicatively coupled to the external controller, the external controller being configured to control the yaw drive based on input signals received from the user interface.

14. The wind turbine of claim 10, wherein the external controller is configured to control one or more yaw adjustment mechanisms of the yaw drive and one or more yaw brakes of the yaw drive based on the received measurement signals or input signals.

15. The wind turbine of claim 10, wherein the external controller comprises a variable frequency drive architecture.

16. The wind turbine of claim 15, wherein the external controller is configured to generate control signals having a plurality of frequencies or voltages.

17. The wind turbine of claim 10, wherein the external controller is configured to control the yaw drive based on a location of assembly or repair equipment.

18. The wind turbine of claim 10, wherein the wind condition is a wind direction or a wind speed.

19. The wind turbine of claim 10, wherein the external sensor is configured for mounting on a nacelle of the wind turbine.

* * * * *